(12) United States Patent
Schaff et al.

(10) Patent No.: US 9,761,271 B1
(45) Date of Patent: Sep. 12, 2017

(54) WORKLOAD DETECTION FOR ADJACENT TRACK INTERFERENCE MITIGATION

(71) Applicant: Seagate Technology LLC, Cupertino, CA (US)

(72) Inventors: Michael D. Schaff, Longmont, CO (US); Abhay T. Kataria, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/224,886

(22) Filed: Aug. 1, 2016

(51) Int. Cl.
*G11B 20/18* (2006.01)

(52) U.S. Cl.
CPC ................. *G11B 20/1816* (2013.01)

(58) Field of Classification Search
None
See application file for complete search history.

(56) References Cited

U.S. PATENT DOCUMENTS

| | | | | |
|---|---|---|---|---|
| 4,819,095 A | * | 4/1989 | Asano | G11B 5/59627 360/77.04 |
| 5,027,230 A | * | 6/1991 | Nakayama | H04N 1/2104 360/32 |
| 8,023,215 B1 | | 9/2011 | Ghaly et al. | |
| 8,819,380 B2 | | 8/2014 | Patil et al. | |
| 8,879,180 B2 | | 11/2014 | Deki et al. | |
| 9,324,362 B1 | * | 4/2016 | Gao | G11B 20/1833 |
| 9,330,701 B1 | | 5/2016 | Michel et al. | |
| 2011/0075290 A1 | * | 3/2011 | Hobbet | G11B 5/09 360/55 |
| 2012/0113786 A1 | * | 5/2012 | Kelkar | G11B 27/36 369/53.44 |
| 2012/0194946 A1 | * | 8/2012 | Watanabe | G11B 5/012 360/78.04 |
| 2013/0254509 A1 | * | 9/2013 | Patil | G06F 3/0611 711/170 |
| 2014/0016224 A1 | * | 1/2014 | Unoki | G11B 5/012 360/49 |
| 2014/0022661 A1 | * | 1/2014 | Sugawara | G11B 5/012 360/31 |
| 2014/0071559 A1 | * | 3/2014 | Toda | G11B 20/1879 360/55 |
| 2016/0148630 A1 | * | 5/2016 | Rausch | G11B 5/09 360/77.02 |

\* cited by examiner

*Primary Examiner* — Peter Vincent Agustin
(74) *Attorney, Agent, or Firm* — Holzer Patel Drennan (57) ABSTRACT

A storage device includes a controller configured to adjusts direct offline scan (DOS) parameters for a scan of a storage region based on a workload affecting the storage region to mitigate data loss due to adjacent track interference (ATI) while also mitigating performance delays due to DOS execution. In one implementation, a type of workload occurring in a region is determined by assessing a distribution of write track counter values corresponding to data tracks in the region.

20 Claims, 4 Drawing Sheets

WORKLOAD DETECTION FOR ADJACENT TRACK INTERFERENCE MITIGATION

BACKGROUND

In magnetic recording devices, adjacent track interference (ATI) is encountered when a target data track on a magnetic recording medium is written a large number of times without adjacent tracks being written to. Over time, data writes to the target data track may degrade or corrupt data on the adjacent tracks. Modern devices utilize a number of mechanisms to mitigate data corruption due to ATI including, for example, utilization of write counters that trigger periodic read scans and/or data re-writes to fix corrupted data before it becomes irreparably damaged.

SUMMARY

Implementations disclosed herein provide for a workload-specific adjustment to a direct offline scan (DOS) parameter responsive to a determination that a write track counter value for a first data track satisfies a need-to-scan (NTS) threshold. The DOS parameter adjustment is implemented based on a dynamic assessment of write track counter values corresponding to a plurality of data tracks including data tracks on opposite sides of the first data track.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Different write patterns may influence erasure phenomena, such as adjacent track interference (ATI) and side track erasure (STE), in different ways. The following examples and discussion specifically relate to mitigation and correction of ATI; however, it may be understood that the disclosed techniques may be adapted to mitigate and correct for a variety of types of erasure phenomena, including without limitation STE.

Measures for monitoring and correcting data degradation due to erasure phenomena such as ATI and STE may introduce processing delays that hinder performance of a storage device. For example, a direct offline scan (DOS) may be performed to "check" integrity of a data track periodically based on the number of times that nearby data tracks are re-written. When a DOS is executed, a host device may be forced to pause all drive access (read/write) commands and wait until the DOS is complete or until a scan timer expires to resume storage operations. Thus, there exists a tradeoff between data preservation measures and device performance.

Different workloads (e.g., write jobs) may impact erasure phenomena differently. If, for example, a same data track is re-written many times during a time interval when the adjacent tracks are not re-written, the risk of ATI on the adjacent tracks is high. In contrast, a number of random writes to a data region may have little or no impact on ATI. These two extremes (e.g., repeated single track re-write v. repeated random writes distributed across a region) may occur during normal device usage and/or occur during certain tests performed by a host device.

The herein disclosed technology provides for dynamic adjustments to DOS practices based on real-time evaluations of erasure phenomena risk due to characteristics of a currently-executing (or recently executed) workloads. When, for example, a risk of ATI is low, as in the case of repeated random writes in a region, it may be desirable to decrease a frequency of DOSs to improve device performance. In contrast, when the risk of ATI is high, as in the case of repeated writes of a single data track, it may be beneficial to implement extra data preservation measures to ensure data integrity, such as by increasing the frequency of DOS and/or giving the storage device additional time to complete each DOS.

Figure 1:
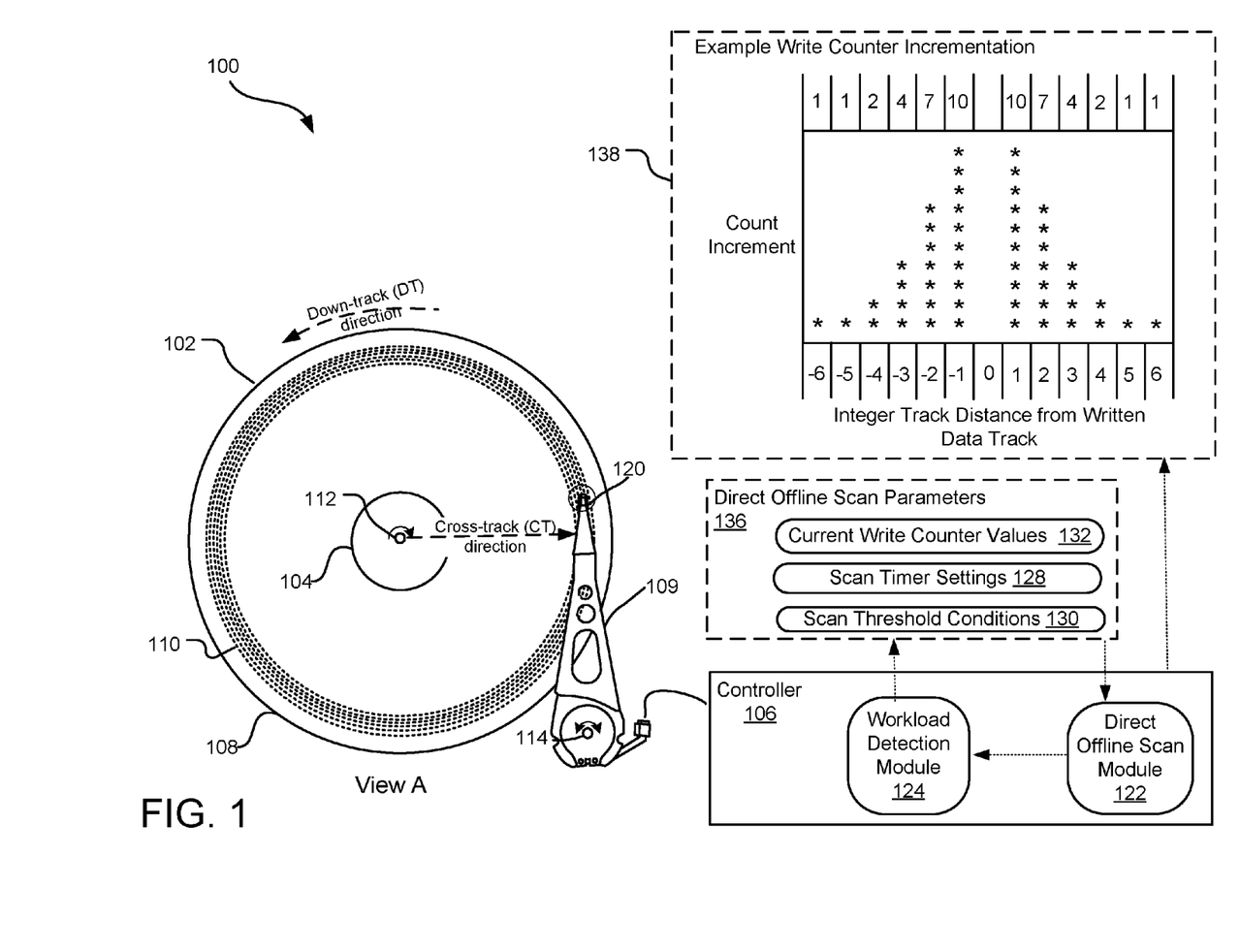
FIG. 1 illustrates a data storage device that implements workload-specific ATI monitoring and mitigation practices.

FIG. 1 illustrates a data storage device 100 that implements workload-specific ATI mitigation practices. The storage device 100 includes a transducer head assembly 120 for writing data on a magnetic storage medium 108. Although other implementations are contemplated, the magnetic storage medium 108 is, in FIG. 1, a magnetic storage disc on which data bits can be recorded using a magnetic write pole and from which data bits can be read using a magnetoresistive element (not shown). The magnetic storage medium 108 rotates about a spindle center or a disc axis of rotation 112 during rotation, and includes an inner diameter 104 and an outer diameter 102 between which are a number of concentric data tracks (e.g., a data track 110). Information may be written to and read from data bit locations in the data tracks on the magnetic storage medium 108.

The transducer head assembly 120 is mounted on an actuator assembly 109 at an end distal to an actuator axis of rotation 114. The transducer head assembly 120 flies in close proximity above the surface of the magnetic storage medium 108 during disc rotation. The actuator assembly 109 rotates during a seek operation about the actuator axis of rotation 114 to position the transducer head assembly 120 over a target data track (e.g., the data track 110) for a read or write operation. The transducer head assembly 120 includes at least one write element (not shown) that further includes a write pole for converting a series of electrical pulses sent from a storage device controller 106 into a series of magnetic pulses of commensurate magnitude and length. The magnetic pulses of the write pole selectively magnetize magnetic grains of the rotating magnetic storage medium 108 as they pass below the pulsating-write element.

In general, the storage device controller 106 controls positioning of the transducer head assembly 120 and also performs tasks such as executing drive access commands. In FIG. 1, the storage device controller 106 includes a Direct Offline Scan (DOS) module 122 and a workload detection module 124, which work in concert to monitor and correct for ATI-related data degradation while ensuring high device performance at times when a risk of ATI is low.

In one implementation, the DOS module 122 manages a write track counter in association for every writable data track on the storage medium 108. For example, current write counter values 132 for the various data tracks may be managed within a write counter table stored in volatile or non-volatile memory during nominal drive usage. Each time a data track is written, the DOS module increments write track counters of select adjacent tracks, signifying an increased risk of ATI to those tracks.

In some implementations, incrementing write track counters entails scaling an entire affected region (e.g., more than just immediately adjacent tracks) by a scalar value to obtain a new increment write count. For example, a plot 138 illustrates an example of write counter incrementation responsive to a data write to a central data track in a region of the storage medium 108. In the plot 138, the vertical axis illustrates write track counter incrementation and the horizontal axis indicates track position represented in terms of integer tracks from a central data track (e.g., integer '0'), where the central track has just received data in a write operation. Since the data tracks closest to the central data track (e.g., tracks closest to integer 0 on the horizontal axis) are at a highest risk of ATI, the write counter for each of the data tracks increments in proportion to a distance from the central data track where the data is written. For example, write counters for the data tracks immediately adjacent to the central data track increment by 10; write counters for the data tracks two tracks away from the central data track increment by 7; write counters for the data tracks three tracks away from the central data track increment by 4, etc. Although not shown in the plot 138, a write to the central track (e.g., at integer 0) may increment a write track counter of the central track by the same number of counts as the adjacent data tracks (e.g., at integer positions +/−1). Consequently, the central data track and two adjacent data tracks may have write track counters with identical count values.

When the write track counter for any given data track reaches a predetermined threshold (referred to herein as a "Need-to-Scan" (NTS) threshold), the DOS module 122 may initiate a direct offline scan (DOS) of the corresponding data track. A DOS, sometimes also referred to as a defective data scan, measures and corrects for data track degradation. During the DOS, data is read back from a data track and a number of correctable read errors are counted. Correctable read errors may be detected, for example, by parity bits and error correction code designed to correct up to a threshold number of errors on a data track. If the number of correctable read errors exceeds a threshold, the storage device controller may elect to re-write the data of that data track before the data degradation worsens and becomes irreparable. As used herein, the terminology "DOS" is used to refer to both the scan of a data track and, when applicable, the subsequent correction of errors detected during the associated scan.

As mentioned above, a host device (not shown) may be forced to pause all read and write commands and 'wait' for each DOS to execute. Thus, although a high frequency of data scans may improve data integrity, excessive and/or long data scans can also reduce device performance. To intelligently address this trade-off, the workload detection module 124 dynamically adjusts DOS parameters 136 based on analysis of a currently-executing or recently-executed workload affecting a region on the storage medium 108. For example, the workload detection module 124 may dynamically adjust one or more scan parameters to favor increased device performance (and decreased time scanning) or more intensive data-preservation measures to prevent data loss.

The DOS module 122 then utilizes these adjusted DOS parameters 136 to determine when and how to execute a DOS.

As used herein, a "Direct Offline Scan parameter" (or DOS parameter) is a parameter affecting the frequency or length of a DOS. Although other DOS parameters may also be adjusted based on workload, FIG. 1 includes example DOS parameters 136 including scan timer settings 128, scan threshold conditions 130, and current write counter values 132. The scan timer settings 128 may include, for example, parameters affecting the timing of a DOS, such as one or more timers specifying a time allotted for a full DOS or uninterrupted portion of a DOS. The scan threshold conditions 130, in contrast, specify one or more conditions for initiation of a DOS (e.g., a NTS threshold value and conditions for determining when the NTS threshold is satisfied). The current write counter values 132 are also considered DOS parameters because these values can be manipulated (e.g., increased or decreased) to affect the timing of a DOS.

In one implementation, the DOS module 122 queries the workload detection module 124 whenever the scan threshold conditions 130 are satisfied for a given data track. For example, the DOS module 122 may query the workload detection module 124 when a write track counter for a data track 110 has a count value that equals or exceeds a NTS threshold. Responsive to the query, the workload detection module 124 performs a real-time assessment of current write track counter values of nearby data tracks. If this assessment is indicative of a particularly high or low risk of ATI, the workload detection module 124 may dynamically adjust one or more of the DOS parameters 136 pertaining to a subsequent DOS of the data track 110.

In one implementation (e.g., as discussed in detail with respect to FIG. 2), a risk of ATI is determined to be low when there exists a small difference between the NTS threshold and current write track counter values of a plurality of data track in close proximity to the data track currently satisfying the scan threshold conditions 130. In this case, the workload detection module 124 may dynamically adjust one or more of the DOS parameters 136 to delay a scan and thereby increase device performance. For example, the workload detection module 124 may decrease the current count value of the target data track such that the scan threshold conditions 130 are no longer satisfied. This action may have the effect of delaying a scan for a period of time until scan threshold conditions are against satisfied, at which time the workload detection module 124 may again assess the risk of ATI in a similar manner.

In another implementation (e.g., discussed in detail with respect to FIG. 3), a risk of ATI is determined to be high when there exists a large difference between the NTS threshold and current write track counter values of a plurality of data tracks in close proximity to a data track currently satisfying the scan threshold conditions 130. In this case, the workload detection module 124 may dynamically adjust one or more of the DOS parameters 136 to implement more aggressive scanning techniques and increase data loss protection in a subsequent DOS of the data track. For example, the workload detection module 124 may increase the time allotted for the DOS to execute.

In various implementations, the storage device controller 106, the DOS module 122, and the workload detection module 124 include software and/or hardware, and may be implemented in any tangible computer-readable storage media within or communicatively coupled to the data storage device 100. As used herein, the term "tangible computer-readable storage media" includes, but is not limited to, RAM, ROM, EEPROM, flash memory or other memory technology, CDROM, digital versatile disks (DVD) or other optical disk storage, magnetic disk storage or other magnetic storage devices, or any other tangible medium which can be used to store the desired information and which can be accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

Figure 2:
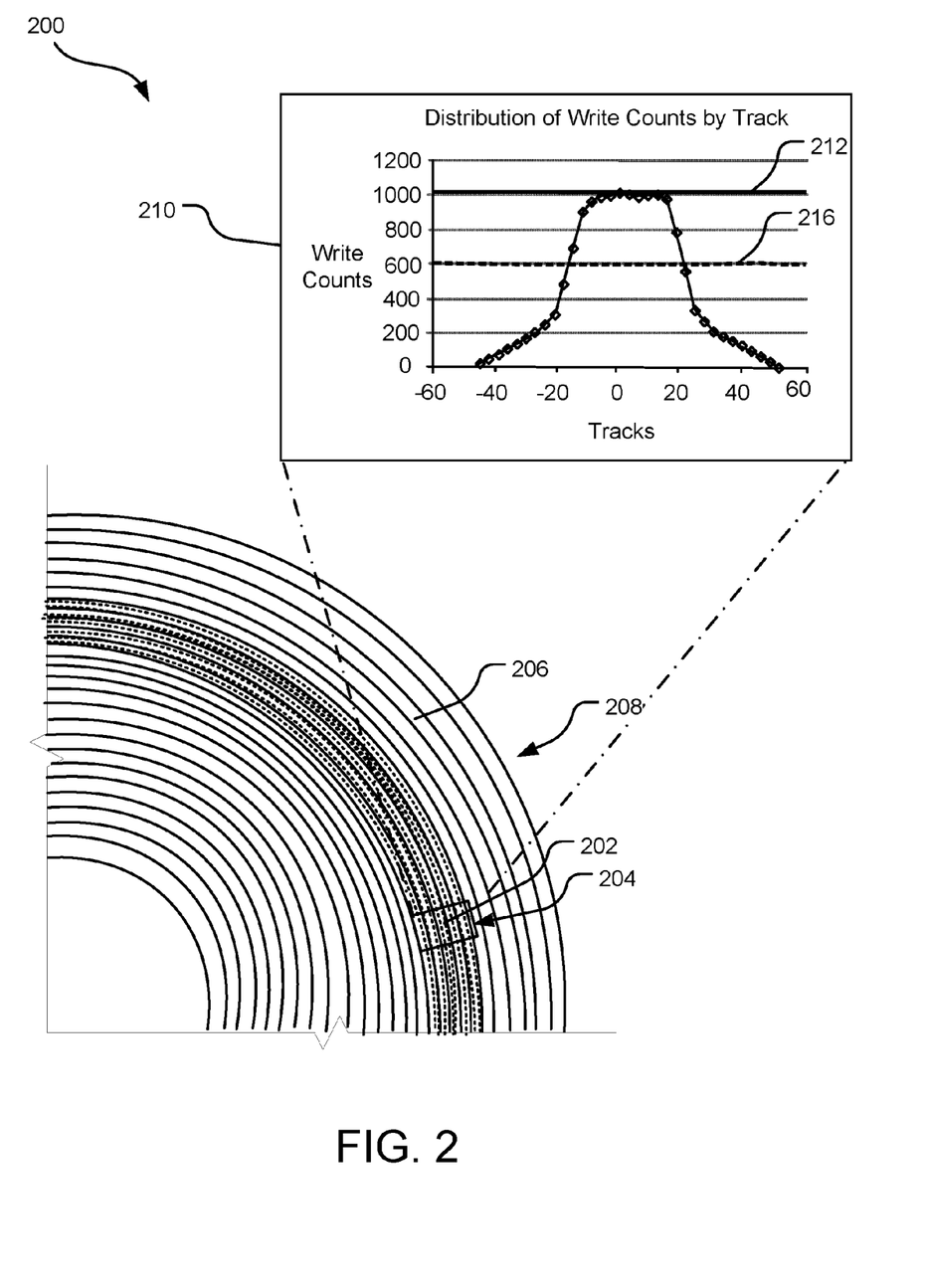
FIG. 2 illustrates a storage system that detects workload in various regions of a storage medium to dynamically adjust one or more direct offline scan (DOS) parameters.

FIG. 2 illustrates a storage system 200 that assesses workload in various regions of a storage medium 208 to dynamically adjust DOS parameters. In one implementation, each data track (e.g., data tracks 202, 206) on the storage medium 208 has an associated write track counter, stored in memory, that is incremented by one or more counts each time data is written to an adjacent data track in a same region of a storage medium. For example, every time data is written to a central data track 202 in data region 204, write track counters are incremented for the central data track 202 and a plurality (or all) of the other data tracks in the data region 204.

Incrementation of the write track counters in the data region 204 may be performed differently in different implementations; in one implementation, each data write to the storage medium 208 results in a scalar incrementation affecting all write track counters in the data region 204, such as in a manner the same or similar to that discussed above with respect to the example plot 138 in FIG. 1. In one implementation, a data write to the central data track 202 increments a write track counter of the central data track 202 by a same number of counts as the two immediately adjacent data tracks. Therefore, write track counters for the central data track 202 and the two immediately adjacent tracks may all reach a Need-to-Scan (NTS) threshold at the same time. In other implementations, the central data rack 202 may reach a NTS threshold independent of the immediately adjacent track or, in the alternate, concurrently with a plurality of additional tracks. For this reason, the phrase "NTS track(s)" is used below to refer to a grouping of one or more directly adjacent data tracks with write track counters satisfying a common NTS threshold at a common point in time. For example, write track counters for the central data track 202 and its two immediately adjacent tracks are NTS tracks if associated write track counters reach the NTS in unison.

When the write track counter for any data track satisfies a predetermined Need-to-Scan (NTS) threshold, workload characteristics of the associated region are analyzed to determine whether to execute a DOS of the corresponding data track. For example, workload characteristics of the data region 204 are assessed when the write track counter for the central data track 202 meets or exceeds an NTS threshold 212 (e.g., 1000 counts) (e.g., when the NTS track(s) are identified). Responsive to identification of one or more NTS tracks, the storage system 200 assesses a distribution of write counts 210 for some or all data tracks within the data region 204 to determine an associated level of ATI risk (e.g., high-risk, low-risk, medium-risk). For example, a grouping of tracks characterized by a wide, disparate range of write track counter values (e.g., high average count deltas or high count deltas between adjacent tracks) may indicate an especially high risk of ATI. In contrast, a grouping of tracks characterized by similar write track counter values (e.g., small average count deltas or small count deltas between adjacent tracks) may indicate an especially low risk of ATI.

The distribution of write counts 210 is an example distribution indicative of low ATI risk. In this distribution, the central data track 202 (represented by integer 0 on the horizontal axis) has a write counter with a current count value equaling an NTS threshold 212 (e.g., 1000 counts). A range of data tracks (+/−~15 tracks) surrounding the central data track 202 have write track counters that reflect very similar, high write counter values that are at or just below the NTS threshold 212. In one implementation, this similarity in count values in the center of the data region 204 indicates that the centrally-located data tracks have been recently subjected to a number of repeated, random data writes.

In one implementation, the distribution of counts 210 is indicative of a currently executing or recently-executed calibration known as a "performance test." During a performance test, a host may randomly write to different tracks in a same region of a storage medium to identify defects and to evaluate drive performance. A performance test may be initiated by a customer when, for example, the customer intends to store data in a finite region that is to be re-written frequently, at random. In one implementation, the performance test repeatedly writes test data to a range of tracks in the storage region in a random track order to ensure that the finite region does not have defects unnecessarily slowing drive performance. For example, repeated random writes (e.g., roughly illustrated by dotted lines on the storage medium 208) are made to the grouping of tracks centered on the central data track 202 and including a range of immediately surrounding data tracks (e.g., +/15 tracks from the data track 202).

In still other scenarios, repeated random writes to a region may occur for reasons unrelated to execution of a performance test. Both of the above-described scenarios (e.g., performance test scenario v. non-test scenario) are likely to result in a distribution similar to the distribution of counts 210, which reflects very small differences in count value for write counters associated with data tracks adjacent to either side of the central data track 202.

To assess ATI risk and adjust DOS parameters accordingly, the storage device 200 determines whether this distribution of counts 210 satisfies a count similarity condition. For example, the storage device 200 compares count values of various data tracks in the data region 204 to the NTS threshold 212 to assess current ATI risk. In one implementation, the workload detection module compares the NTS threshold 212 to the current count value on each of two or more data tracks on opposite sides of the NTS track(s). If count values of these tracks satisfy a count similarity condition when compared to the NTS threshold 212, the risk of ATI is determined to be low.

For example, the workload distribution module may assess the count values of the two data tracks positioned at +/−1 track away from either end of the NTS track(s). If both of these adjacent tracks have a count value higher than an evaluation threshold 216 (e.g., greater than X % of the NTS threshold, where X is predetermined), then the risk of ATI is determined to be low and action may be taken to cancel or postpone a DOS. In one example, the evaluation threshold 216 is 53% of the NTS.

In another implementation, the workload distribution module compares the NTS threshold 212 to count values of two or more data tracks symmetrically offset from the NTS track(s). If, for example, the NTS threshold 212 is 1000 and the data tracks offset by +5 and −5 tracks from the NTS track(s) reflect count values of 905 and 962, respectively, the workload distribution module may determine that a count similarity condition is satisfied and that, consequently, the risk of ATI is relatively low. In one non-limiting example, the count similarity condition is satisfied when the counter values at symmetrically offset tracks (+/−N), from the NTS track(s), are greater than 53% of the NTS threshold. If, for example, tracks at position −1, 0, and 1 all satisfy the NTS threshold, the count similarity condition may be satisfied when the data tracks at the +/−2 positions have write track counter values greater than 53% of the NTS threshold 212.

In yet another implementation, the workload distribution module assesses the percentage of data tracks within a particular offset range (e.g., +/−15, 20, 30, etc.) from the NTS track(s) that have a write count value greater than an evaluation threshold 216 (e.g., greater than X % of the NTS threshold in FIG. 2, where X is a predetermined value). If a large percentage (e.g., 80%) of the data tracks examined in this range have count values in excess of the evaluation threshold 216, the workload detection module may determine that the count similarity condition is satisfied and that, consequently, the risk of ATI is low.

Notably, a variety of other mathematical techniques may be similarly utilized to determine that the data tracks (e.g., tracks +/−15) surrounding the central data track 202 have high count values similar to the NTS threshold 212 indicative of low ATI risk.

The exact position and number of data tracks used in assessing the count similarity condition may vary in different implementations. In one implementation, the storage system 200 assesses count values for a single pair of data tracks, such as two data tracks symmetrically offset from either end of the NTS track(s). In another implementation, the storage system 200 assesses count values for a number of data tracks on either side of the NTS track(s). For example, the storage system 200 may determine an average count value for X number of tracks directly to the right of the NTS track(s) and an average count value of X number of tracks directly the left of the NTS track(s)

When the count similarity condition is satisfied for the tracks within the data region 204, the workload detection module adjusts a scan parameter for the NTS track(s). In one implementation, the workload detection module reduces the count value of the NTS track(s) (e.g., the central data track 202 and the two immediately adjacent data tracks) by a predetermined amount in order to postpone a DOS. Although the specific magnitude of the count reduction may vary from one implementation to another, the count value of the write track counter for the NTS track(s) is, in one implementation, reduced to 0.6*(NTS threshold).

As additional data is written to other data tracks in the data region 204, the count value of the NTS track(s) may again climb to the NTS threshold. Upon reaching the NTS threshold a second time, the storage system 200 again assesses the count similarity condition to determine whether the risk of ATI is particularly low. If the count similarity condition is not satisfied at the time of this subsequent assessment, the NTS track(s) may be subjected to an immediate DOS and re-written if a number of read errors is high. In some cases, the workload detection module may also assess whether the risk of ATI is unusually high and/or alter further scan parameters in favor of more aggressive scans to ensure data integrity. One such example is discussed below with respect to FIG. 3.

Figure 3:
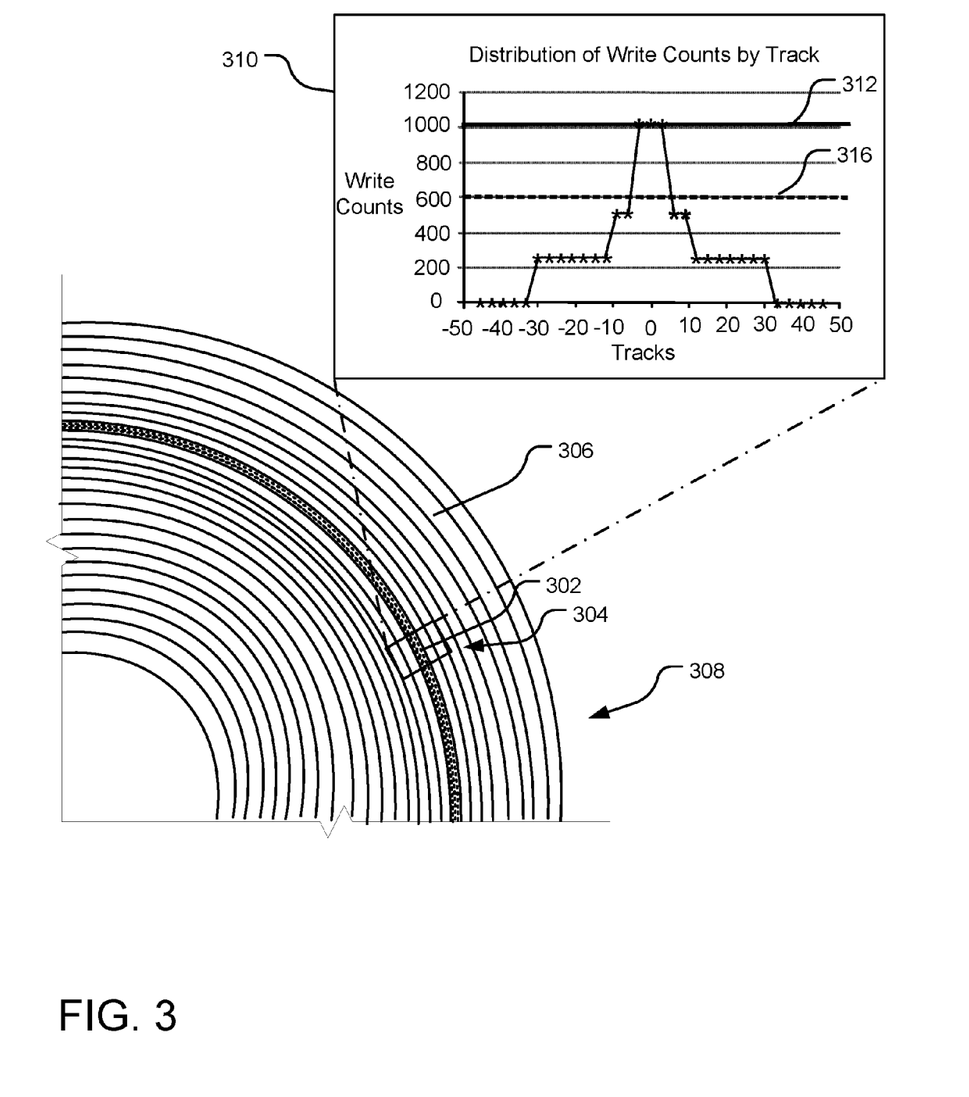
FIG. 3 illustrates a storage system that detects workload in various regions of a storage medium to dynamically adjust one or more DOS parameters.

FIG. 3 illustrates a storage system 300 that assesses workload in various regions of a storage medium 308 to dynamically adjust DOS parameters. Each data track (e.g., 302, 306) on the storage medium 308 has an associated write track counter (not shown) that is incremented by one or more counts each time that data is written to a directly adjacent or nearby data track in a same region of a storage medium. For example, each time that data is written to a central data track 302 in a data region 304, write track counters are incremented for each of the other data tracks in the data region 304. Incrementation of the write track counters in the data region 304 may be performed differently in different implementations; in one implementation, each data write to the storage medium 308 results in a scalar incrementation affecting all write track counters in the data region 304, such as in a manner the same or similar to that discussed above with respect to the example plot 138 in FIG. 1.

When the write track counter for any data track on the storage medium 308 satisfies a predetermined Need-to-Scan (NTS) threshold, workload characteristics of an associated region are analyzed to determine and/or adjust DOS parameters accordingly. For example, workload characteristics of the data region 304 are assessed when the write track counter for a central data track 302 in the data region 304 meets or exceeds an NTS threshold (e.g., 1000 counts). At such time, the storage device 300 assesses a distribution of write counts 310 for some or all data tracks within the data region 304 to determine an associated level of ATI risk (e.g., high-risk, low-risk, medium-risk).

Notably, different implementations may employ different methods of write track counter incrementation. In some implementations, the write track counter for the central data track 302 may reach the NTS in unison with one or more other adjacent tracks. For this reason, the phrase "NTS track(s)" is again used below to refer to a grouping of one or more directly adjacent tracks with write counters satisfying the NTS threshold at a given point in time.

The distribution of write counts 310 is an example distribution indicative of high ATI risk. In this distribution, the central data track 302, represented by integer 0 on the horizontal axis, has a write track counter value equaling an NTS threshold 312 (e.g., 1000 counts). Data tracks at positions +/−1 from the central data track 302 are also shown to equal the NTS threshold 312. Thus, data tracks at the positions −1, 0, and 1 collectively comprise the "NTS track(s)" in the following example. A range of data tracks surrounding the NTS track(s) have associated write track counter values that drop sharply with radial distance from either side of the NTS track(s). This count disparity between the write track counter value of the NTS track(s) (e.g., at the NTS threshold) and write track counter values of adjacent tracks, such as at +/−N (e.g., the distribution shows a count disparity for N greater than or equal to ~3) is observable when, for example, one or more tracks in the center of the data region 304 have been re-written repeatedly during a time interval in which the adjacent tracks are not re-written. These repeated writes to the central data track 302 are shown, for example, by dotted lines on the storage medium 308 in FIG. 3. As a result of these repeated writes to a same data track location, there exists a high risk of data corruption due to ATI within the data region 304.

In one implementation, the distribution of counts 310 is indicative of a currently executing or recently-executed calibration known as a "beat-up test." During a beat-up test, a host may repeatedly write to a same data track in a region to test various characteristics of the region, such as to measure a number of repeated writes that cause data corruption. Beat-up tests may be periodically performed by the host and may, for example, be performed during idle times when there are no other active read or write requests.

In many devices, a storage device controller manages a scan timer that imposes a maximum time limit for execution of a DOS or a series of DOSs. The scan timer is, in theory, designed to prevent the user from noticing performance delays that may otherwise occur while a host waits for DOS to complete. This scan timer may "time-out" and postpone completion of a scan when a DOS takes longer than usual to complete, such as when the DOS detects a large number of errors that are to be corrected by the Error Correction Code (ECC). Consequently, there exist scenarios when the scan timer expires before all detected errors are corrected by the ECC. In such scenarios, read/write control is handed back to the host and the ongoing DOS is postponed until a future point in time.

In the case of ATI beat-up (either via host-initiated beat-up testing or user-initiated writes), scan timers are more likely than usual to time-out because a large number of errors may be caused by repeated writes to a same data track. These additional errors may take additional time to correct during the DOS. If a scan timer expires and the DOS is interrupted, there may exist some corrupted data bits that are not corrected at a time when the host regains read/write control and resumes repeated data writes to the same track or localized region of tracks, causing further data corruption before the DOS can be resumed and finished. If a total number of errors on a single data track becomes too great, the error correction code (ECC) may not be able to correct the corrupted bits and data can be lost. Therefore, ATI-beat up is one scenario that may benefit from more aggressive scanning to prevent worsening of data degradation in a region while one or more DOSs are "paused" due to scan timer expiration.

In cases where the distribution of counts 310 is the result of a host-initiated beat-up test, extending the scan timer may have no noticeable impact on device performance because the beat-up test may itself be an idle-time activity. Consequently, more aggressive scanning measures may be implemented without any performance cost. In other cases where the distribution of counts 310 is the result of user-initiated writes to a same track, extending the scan timer may cause some performance delays; however, the high-risk circumstances may justify such minor performance delays in the interest in data preservation.

Responsive to identification of one or more NTS tracks, the workload detection module takes a number of actions to assess current ATI risk and adjust DOS parameters. During this process, the storage device 300 determines whether the distribution of counts 310 satisfies a count disparity condition. For example, the storage device 300 assesses the count disparity condition by comparing count values of various data tracks in the data region 304 to the NTS threshold 312. In one implementation, the storage device 300 compares the NTS threshold 312 to the current count value on each of two or more data tracks on opposite sides of the NTS track(s). For example, the workload distribution module may assess the count values of the two data tracks immediately adjacent to either side of the NTS track(s). If both of these adjacent tracks have a count value lower than an evaluation threshold 316 (e.g., greater than X % of the NTS threshold, where X is predetermined), then the risk of ATI is determined to be high and action may be taken to immediately implement a DOS of each of the NTS tracks and/or adjust a scan parameter to allow for more aggressive scanning of such tracks (e.g., by permitting an extended period of time for each scan to complete). In one example, the evaluation threshold 316 is 53% of the NTS.

In another implementation, the workload detection module assesses a difference between the count value of the NTS track(s) (e.g., the NTS threshold 312) and the count value on each of two or more other data tracks symmetrically located on opposite sides of the NTS track(s). If, for example, the NTS threshold is 1000 and the data tracks +5 and −5 each reflect count values lower than the evaluation threshold 316, the workload detection module may determine that the distribution of counts 310 satisfies a count disparity condition and that consequently, the risk of ATI is high.

The count disparity condition may vary considerably in one implementation to another. However, in one non-limiting example, the count disparity condition is satisfied when the counter values at symmetrically offset tracks (e.g. +/−N) from either side of the NTS track(s) are each below 60% of the NTS threshold. In another implementation, the count disparity condition is satisfied when the counter values of the two tracks directly adjacent the NTS track(s) are each below 53% of the NTS threshold.

In another implementation, the storage system 300 determines whether the count disparity condition is satisfied by assessing the percentage of data tracks within a particular offset range (e.g., +/−15, 20, 30, etc.) from the NTS track(s) that have a write count value less than an evaluation threshold (e.g., below 60% of the NTS threshold in FIG. 3). If a large percentage (e.g., 80%) of the data tracks examined in this range have count values below the evaluation threshold 316, the storage system 300 may determine that the count disparity condition is satisfied and that, consequently, the risk of ATI is high. Notably, a variety of other mathematical techniques may be similarly utilized to determine that a disproportionate number of repeated writes have been directed to the central data track 302.

The exact position and number of data tracks of the data region 304 used in assessing the count disparity condition may vary in different implementations. In one implementation, the storage system 300 assesses count values for a single pair of data tracks, such as two data tracks symmetrically offset from the NTS track(s). In another implementation, the storage system 300 assesses a slope of count value across a number of points in the distribution of counts 310 increasing distance in both directions away from the NTS track(s). In still other implementations, the storage system 300 assesses an average count value corresponding to a number of data tracks (e.g., symmetrically located data tracks) on either side of the NTS tracks.

When it is determined the count disparity condition is satisfied for the tracks within the data region 304, the workload detection module adjusts at least one DOS parameter to enable more aggressive scanning. In one implementation, the workload detection module increases a length of a time interval provided by a scan timer limiting the time of continuous, interrupted DOS execution. Increasing the length of the time-out timer in this manner permits a next-initiated DOS to execute longer, facilitating correction of an increased number of corrupted data bits before read/write control is handed back to the host. Although the specific magnitude of the scan timer adjustment may vary from one implementation to another, the scan timer for the central data track 302 is, in one implementation, increased by a factor of 30 (e.g., from 0.050 seconds to 1.5 seconds). In another implementation, the scan timer is increased by an amount sufficient to permit the full DOS to execute on one or each of the NTS track(s) before returning read/write control of the storage system 300 to a host. A DOS may be immediately executed on each of the NTS track(s) according to the adjusted can timer.

In some storage devices, read/write control is passed between the storage device controller and a host according to two separate timers. For example, timing for a DOS may be limited by a scan timer of the storage device, as described above. When the scan timer expires, an on-going DOS may be interrupted and read/write control may be handed back to the host. The host then resumes reading and writing while a grace timer begins a countdown. When the grace timer expires, the storage device is again given the opportunity to continue or complete any previously-interrupted DOS. In this manner, read/write control is toggled between the host and storage device according to the grace time and scan timer, respectively. In one such implementation, satisfaction of the count disparity condition (as described above) results in an increase in the scan timer interval and also a decrease in the grace timer interval.

Figure 4:
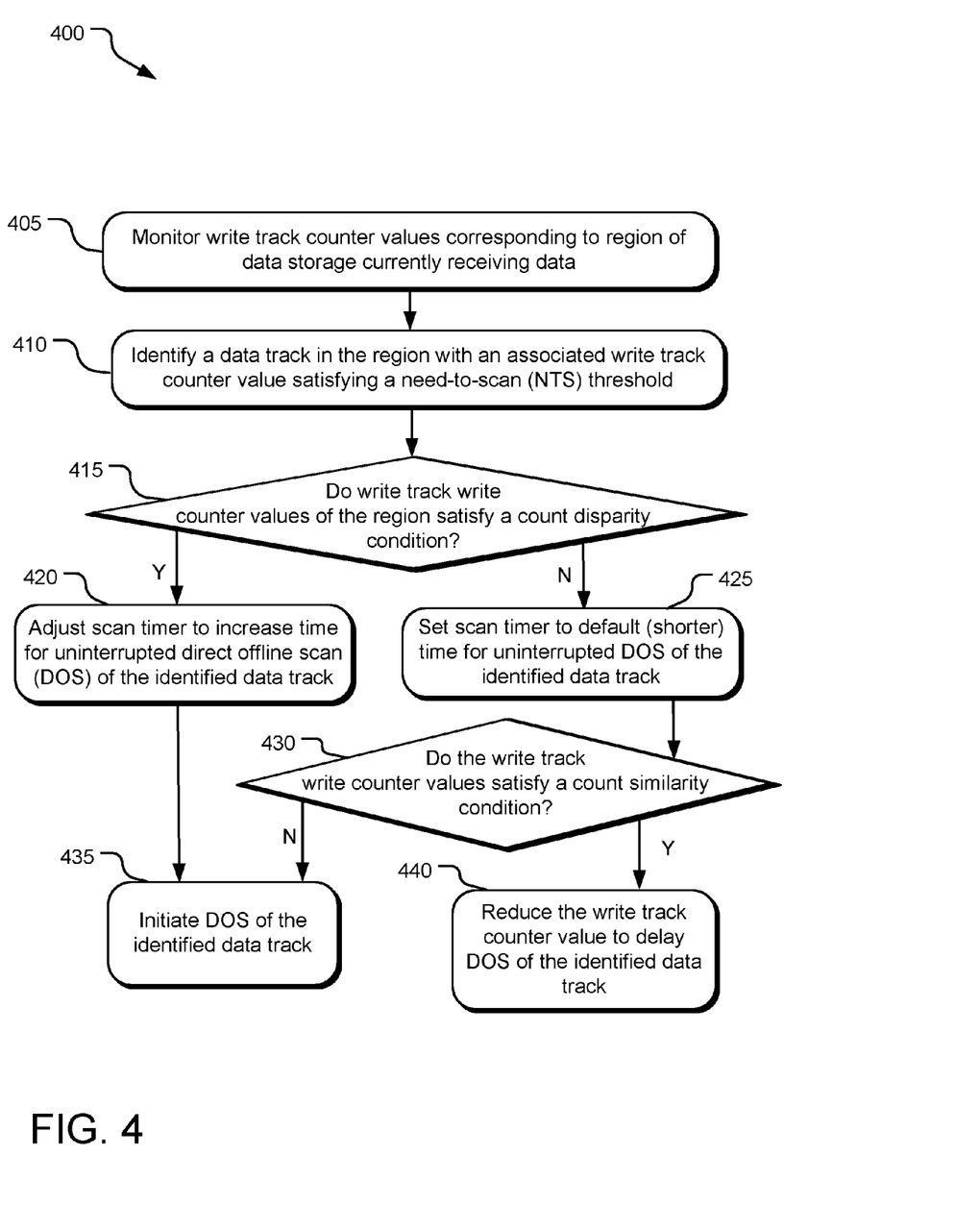
FIG. 4 illustrates example operations for dynamically adjusting one or more DOS parameters based on workload detection in a storage device.

FIG. 4 illustrates example operations 400 for dynamically adjusting one or more DOS parameters based on workload detection in a storage device. Each time a data track is written, write track counters of select adjacent tracks are incremented to indicate an increased risk of ATI to those tracks. In some implementations, incrementing write track counters entails scaling an entire affected region by a scalar value to obtain a new increment write count (e.g., as shown in FIG. 1, plot 138). A monitoring operation 405 monitors values of the write track counters corresponding to a region of data storage currently receiving data. An identification operation 410 identifies data track(s) (e.g., an individual data track or a grouping of multiple directly adjacent data tracks) with associated write track counter value satisfying a need-to-scan (NTS) threshold. Responsive to the identification operation 410, a determination operation 415 determines whether a distribution of the track write counter values corresponding to the region satisfies a count disparity condition. For example, the determination operation 410 may compare the NTS threshold with write track counter values for at least one data track on each side of the identified data track(s) and/or may assess write track counter for one or more pairs or groups of tracks symmetrically located (e.g., +/−N) about the identified data track(s).

If the distribution satisfies the count disparity condition, a risk of ATI is assumed to be high. In this case, an adjusting operation 420 adjusts a scan timer to increase the amount of time allotted for uninterrupted execution of a DOS of the identified data track. A DOS initiation operation 430 initiates the DOS according to the adjusted scan time of the scan timer. During the DOS, the identified data track(s) are read and identified errors are corrected. The count value of the associated write track counter may be reset to zero after the DOS has completed.

If the determination operation 425 determines that the count disparity condition is not satisfied, the scan timer is set to a default value that provides an interval of uninterrupted DOS execution that is smaller than the interval provided by the adjustment operation 420. A determination operation 430 determines whether a distribution of the track write counter values satisfies a count similarity condition. For example, the determination operation 420 may compare the NTS threshold with count values corresponding to at least one data track on each side of the identified data track(s) and/or may assess count values corresponding to one or more pairs of or groups of tracks symmetrically located (e.g., +/−N) about the identified data track(s).

If the count similarity condition is satisfied, a risk of ATI is assumed to be low. In this case, a write counter reduction operation 440 reduces a write count of the write counter for the identified data track to delay a DOS of the identified data track(s). If, however, the determination operation 430 determines that the count similarity condition is not satisfied, a risk of ATI is assumed to be average (e.g., not exceptionally high or exceptionally low). In this case, the initiation operation 435 immediately initiates a direct offline scan (DOS) of the identified data track(s) according to the default scan time. During the DOS, the identified data track(s) are read and identified errors are corrected. The count value of the associated write track counter(s) may be reset to zero after the DOS has completed.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
   determining that a write track counter value of a first data track satisfies a need-to-scan (NTS) threshold;
   dynamically assessing a distribution of write track counter values corresponding to a plurality of data tracks including data tracks on opposite sides of the first data track; and
   adjusting a scan parameter for a direct offline scan (DOS) of the first data track responsive to a determination that the distribution of write track counter values satisfies at least one of a similarity condition and a count disparity condition when compared to the NTS threshold.

2. The method of claim 1, wherein assessing the distribution of write track counter values further comprises comparing the write track counter value of the first data track to write track counter values of a second data track and a third data track symmetrically located on opposite sides of the first data track.

3. The method of claim 2, wherein adjusting the scan parameter further entails increasing a scan timer to effectuate an increase in time permitted to complete the DOS.

4. The method of claim 3, wherein the scan timer is increased if the write track count values for the first data track, the second data track, and the third data track satisfy a count disparity condition.

5. The method of claim 1, wherein adjusting the scan parameter entails postponing the DOS of the first data track by decreasing a write track counter value for the first data track by a predetermined amount.

6. The method of claim 5, wherein the write track counter value for the first data track is reduced by the predetermined amount if write track counter values for each of the first data track, the second data track, and the third data track satisfy a count similarity condition.

7. The method of claim 1, wherein assessing the distribution of the write track counter values further comprises determining that a recent workload executed in a corresponding region included at least one of a beat-up test or a performance test.

8. An apparatus comprising:
a storage controller configured to:
determine that a write track counter value of a first data track satisfies a need-to-scan (NTS) threshold;
compare the write track counter value of the first data track to write track counter values of second and third data tracks located on opposite sides of the first data track;
adjust a scan parameter for a direct offline scan (DOS) of the first data track responsive to a determination that the write track counter value for the first data track and the write track counter values of second and third data tracks satisfy at least one of a similarity condition and a count disparity condition when compared to the NTS threshold.

9. The apparatus of claim 8, wherein the second and third data tracks are symmetrically located on opposite sides of the first data track.

10. The apparatus of claim 8, wherein the storage device controller adjusts the scan parameter by increasing a scan timer to effectuate an increase in time permitted to complete the DOS of the first data track.

11. The apparatus of claim 10, wherein the scan timer is increased if the write track counter values for the first data track, the second data track, and the third data track satisfy a count disparity condition.

12. The apparatus of claim 8, wherein the storage device controller is further configured to adjust the scan parameter and postpone the DOS of the first data track by decreasing the write track counter value for the first data track by a predetermined amount.

13. The apparatus of claim 12, wherein the write track counter value for the first data track is reduced by the predetermined amount if the write track counter values for the first data track, the second data track, and the third data track satisfy a count similarity condition.

14. One or more tangible computer-readable storage media encoding computer-executable instructions for executing on a computer system a computer process, the computer process comprising:
determining that a write track counter value for a first data track satisfies a need-to-scan (NTS) threshold;
dynamically assessing a distribution of write track counter values corresponding to a plurality of data tracks including data tracks on opposite sides of the first data track; and
adjusting a scan parameter for a potential direct offline scan (DOS) of the first track responsive to a determination that the distribution of write track counter values satisfies at least one of a similarity condition and a count disparity condition when compared to the NTS threshold.

15. The computer-readable storage media of claim 14, wherein assessing the distribution of write track counter values further comprises comparing the write track counter value of the first data track to write track counter values for a second data track and a third data track symmetrically located on opposite sides of the first data track.

16. The computer-readable storage media of claim 15, wherein adjusting the scan parameter further entails increasing a scan timer to effectuate an increase in time permitted to complete the DOS.

17. The computer-readable storage media of claim 16, wherein the scan timer is increased if write track count values for the first data track, the second data track, and the third data track satisfy a count disparity condition.

18. The computer-readable storage media of claim 15, wherein adjusting the scan parameter entails postponing the DOS of the first data track by decreasing the write track counter value of the first data track by a predetermined amount.

19. The computer-readable storage media of claim 18, wherein the write track counter value for the first data track is decreased by the predetermined amount if write track counter values for the first data track, the second data track, and the third data track satisfy a count similarity condition.

20. The computer-readable storage media of claim 14, wherein assessing the distribution of the write track counter values further comprises determining that a recent workload executed in a corresponding region included at least one of a beat-up test or a performance test.

* * * * *